US011928163B2

(12) United States Patent
Pottier et al.

(10) Patent No.: US 11,928,163 B2
(45) Date of Patent: Mar. 12, 2024

(54) APPARATUS, METHOD AND COMPUTER PROGRAM FOR CREATING DIGITAL MEMORIES FOR A PARTICULAR PERSON

(71) Applicant: Arm Limited, Cambridge (GB)

(72) Inventors: Remy Pottier, Grenoble (FR); Minsheng Lu, Cambridge (GB); Arthur Michael Goldberg, Parkland, FL (US); Christopher Daniel Emmons, Austin, TX (US)

(73) Assignee: Arm Limited, Cambridge (GB)

( * ) Notice: Subject to any disclaimer, the term of this patent is extended or adjusted under 35 U.S.C. 154(b) by 141 days.

(21) Appl. No.: 17/669,851

(22) Filed: Feb. 11, 2022

(65) Prior Publication Data

US 2023/0259560 A1    Aug. 17, 2023

(51) Int. Cl.
  *G06F 16/908* (2019.01)
  *G06F 16/901* (2019.01)
  *G06N 20/00* (2019.01)

(52) U.S. Cl.
  CPC ........ *G06F 16/908* (2019.01); *G06F 16/9024* (2019.01); *G06N 20/00* (2019.01)

(58) Field of Classification Search
  None
  See application file for complete search history.

(56) References Cited

U.S. PATENT DOCUMENTS 8,621,242 B2 * 12/2013 Brown .................... G06F 21/74
                                               713/193
11,657,100 B2 * 5/2023 Misra .................. G06F 3/04815
                                               707/802

(Continued)

FOREIGN PATENT DOCUMENTS

WO    2019/175569    9/2019

OTHER PUBLICATIONS

Webpage: Wikipedia, "Content-aware pervasive systems", downloaded/printed Jan. 31, 2022, 3 pp, at URL: https://en.wikipedia.org/wiki/Context-aware_pervasive_systems.

(Continued)

*Primary Examiner* — Kim T Nguyen
(74) *Attorney, Agent, or Firm* — NIXON & VANDERHYE P.C.

(57) ABSTRACT

A technique is provided for creating digital memories for a particular person. A data store stores personal data derived from signals gathered from a plurality of sensors that monitor the particular person. Memories creation processing circuitry, responsive to detection of a given event associated with the particular person, performs an augmentation process to generate an augmented given event identifying multiple items of data associated with the given event, including personal data associated with the given event obtained from the data store. The memories creation processing circuitry analyses the multiple items of data identified by the augmented given event in order to generate a given digital memory for the given event. A memories data store stores digital memories generated by the memories creation processing circuitry for the particular person, and memories analysis circuitry determines and maintains associations between the digital memories in the memories data store. Digital twin creation circuitry may then develop cognitive skills via analysis of the digital memories and their associations, for use in assisting the particular person.

25 Claims, 7 Drawing Sheets

(56) References Cited

U.S. PATENT DOCUMENTS

| | | | |
|---|---|---|---|
| 2018/0032691 A1* | 2/2018 | Zur | A61B 5/259 |
| 2018/0300510 A1* | 10/2018 | Lam | G06F 21/6245 |
| 2020/0143943 A1* | 5/2020 | Nelson | G06N 5/045 |
| 2021/0223864 A1* | 7/2021 | Forsland | G06F 1/163 |
| 2022/0138256 A1* | 5/2022 | Misra | G06F 16/906 |
| | | | 707/802 |
| 2023/0259560 A1* | 8/2023 | Pottier | G06F 16/908 |
| | | | 707/705 |

OTHER PUBLICATIONS

Webpage: Javatpoint, "Types of AI Agents", downloaded/printed Jan. 13, 2022, 6 pp., at URL: https://javatpoint.com/types-of-ai-agents.

Karen Henricksen, et al., "Developing Content-Aware Pervasive Computing Applications: Models and Approach", in ScienceDirect, Pervasive and Mobile Computing, vol. 2, Issue 1, Feb. 2006, 32 pp.

U.S. Appl. No. 17/988,099, filed Nov. 16, 2022, Pottier et al.

Flavia Sofia Acerbo et al, "Safe Imitation Learning on Real-Life Highway Data for Human-like Autonomous Driving" 24$^{th}$ IEEE International Conference on Intelligent Transportation Systems—ITSC2021, Sep. 19-22, 2021, (Downloaded from ), https://arxiv.org/abs/2110.04052_on_7_November_2022), 6 pages.

Tom Le Paine et al, "One-Shot High-Fidelity Imitation: Training Large-Scale Deep Nets With RL" Oct. 2018, (Downloaded from https://arxiv.org/abs/1810.05017 on Nov. 7, 2022), 17 pages.

* cited by examiner

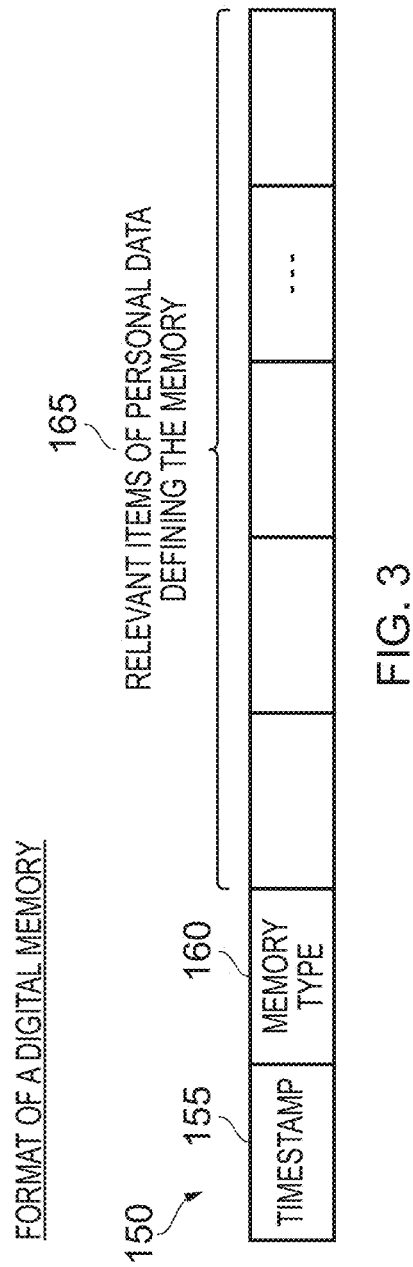

APPARATUS, METHOD AND COMPUTER PROGRAM FOR CREATING DIGITAL MEMORIES FOR A PARTICULAR PERSON

BACKGROUND

The present invention relates to a technique for creating digital memories for a particular person. The created digital memories may be used in developing cognitive skills, and those developed cognitive skills may then be used to assist the particular person.

The idea of modelling a human has been considered in a variety of different technical fields. Research in this area has typically concentrated on the specific problem for which the model of a human could assist, for example developing a daily task assistant for a particular setting, or predicting injuries using digital data about an individual. Accordingly, the results of such research are typically very activity specific, and not generally applicable to other areas of activity. Such techniques also often require the complex calibration of a baseline, for example by reference to a large population of people against which the individual in question can be compared, and may require regular validation to reflect evolution of the baseline and the individual.

It would be desirable to provide a more generic mechanism for modelling a human, in a manner that is scalable and could then be used in a range of physical and digital applications.

SUMMARY

In a first example implementation, there is provided an apparatus comprising: a data store to store personal data derived from signals gathered from a plurality of sensors used to monitor a particular person; memories creation processing circuitry, responsive to detection of a given event associated with the particular person: —to perform an augmentation process during which the memories creation processing circuitry is arranged to generate an augmented given event identifying multiple items of data associated with the given event, including at least items of personal data associated with the given event obtained from the data store; and—to analyse the multiple items of data identified by the augmented given event in order to generate a given digital memory for the given event; a memories data store to store digital memories generated by the memories creation processing circuitry for the particular person, and memories analysis circuitry to determine associations between the digital memories stored in the memories data store and to maintain a record of those associations.

In a second example implementation, there is provided a method of creating digital memories for a particular person, comprising: storing in a data store personal data derived from signals gathered from a plurality of sensors used to monitor a particular person; responsive to detection of a given event associated with the particular person, employing processing circuitry: —to perform an augmentation process to generate an augmented given event identifying multiple items of data associated with the given event, including at least items of personal data associated with the given event obtained from the data store; and—to analyse the multiple items of data identified by the augmented given event in order to generate a given digital memory for the given event; storing within a memories data store digital memories generated by the processing circuitry for the particular person; and determining associations between the digital memories stored in the memories data store and maintaining a record of those associations.

In a third example implementation, there is provided a computer program comprising program instructions which, when executed on a computer, cause the computer to implement a method in accordance with the second example implementation. The computer program may be provided in a transitory or non-transitory form, and in one example implementation a computer-readable storage medium is provided that stores the computer program thereon. In accordance with the third example implementation, the functionality discussed herein in association with the various circuit elements may be performed by software executing on one or more processing devices (e.g. a central processing unit) of a computer.

BRIEF DESCRIPTION OF THE DRAWINGS

The present technique will be described further, by way of illustration only, with reference to examples thereof as illustrated in the accompanying drawings, in which:

FIG. 3 schematically illustrates the format of a digital memory in accordance with one example implementation:

DESCRIPTION OF EXAMPLES

Figure 1:
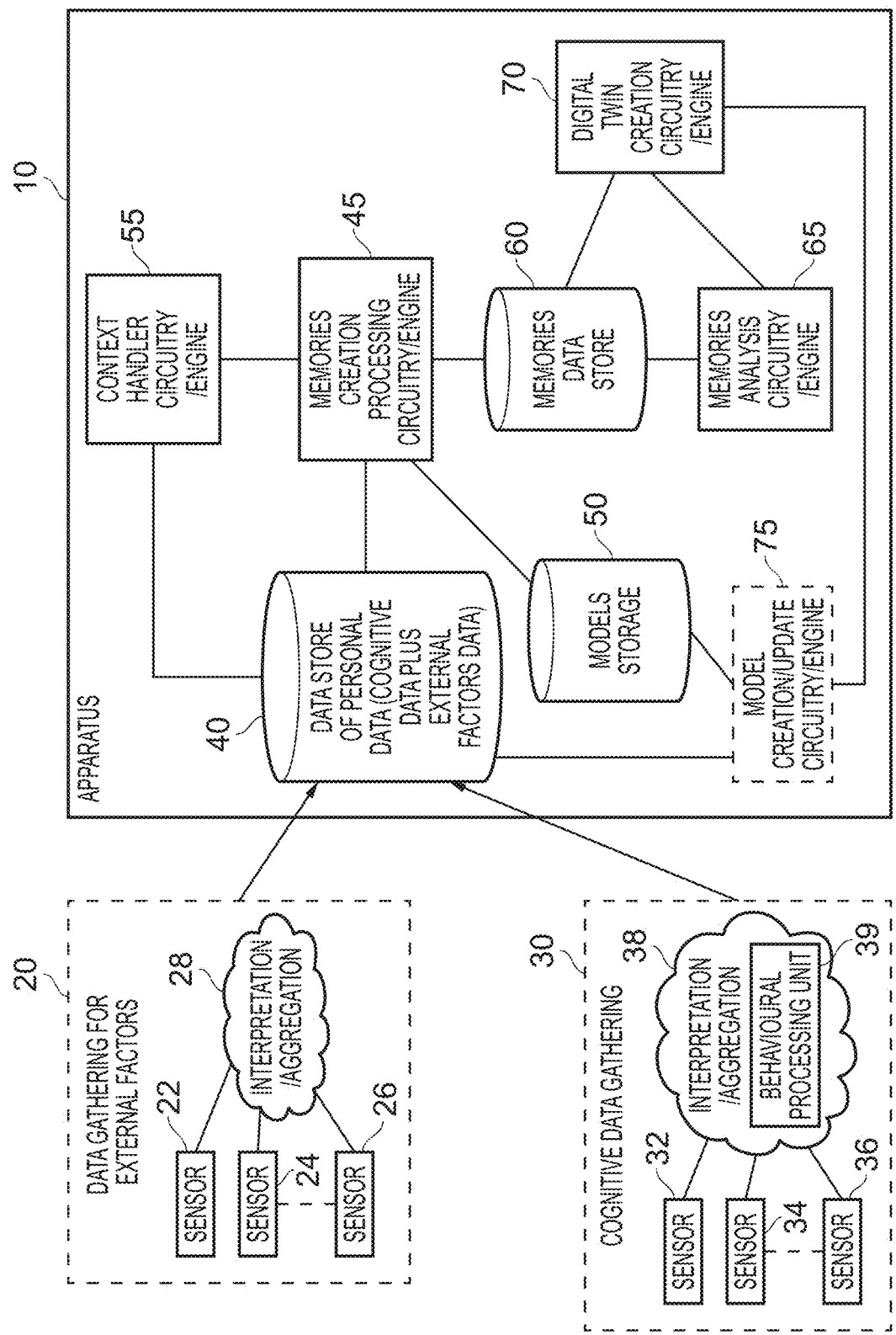
FIG. 1 is a block diagram of an apparatus in accordance with one example implementation.

In accordance with the techniques described herein, an apparatus is provided that employs a data store to store personal data derived from signals gathered from a plurality of sensors used to monitor a particular person (also referred to herein as the individual). The sensors can take a wide variety of different forms, and hence by way of example may comprise sensors provided within one or more of wearable devices, mobile devices used by the individual. Internet of Things (IoT) devices, a brain computer interface (BCI) device, etc., and more generally can take the form of any sensors that can be arranged to monitor the individual. The sensors can be dumb sensors or intelligent sensors. It will be appreciated that over time such a data store can gather together large amounts of personal data that provide a large number of small data items about the individual's life, transactions, emotions, interactions with the world and with machines, etc.

Further, the apparatus provides memories creation processing circuitry that is responsive to detection of a given event associated with the particular person, to perform an augmentation process during which the memories creation processing circuitry generates an augmented given event identifying multiple items of data associated with the given event. These multiple items of data include at least items of personal data associated with the given event that are obtained from the data store. In addition, the memories creation processing circuitry is then arranged to analyse the multiple items of data identified by the augmented given event in order to generate a given digital memory for the given event. Whilst the analysis performed by the memories creation processing circuitry may be performed in an effectively unsupervised manner in one example implementation, in another example implementation the memories creation processing circuitry operates in a supervised manner where the analysis performed by the memories creation processing circuitry is performed with reference to at least one given model. For this purpose, the memories creation processing circuitry can be provided with access to one or more models that can be used to create a digital memory from the multiple items of data identified by the augmented given event. Indeed, if desired, more than one model can be referenced during this process. By arranging the memories creation processing circuitry to refer to one or more particular models, the memories created can be aligned with the types of memories associated with those models, and hence the apparatus can be steered to generate memories of certain types that will be useful when performing subsequent analysis, for example when seeking to develop a high fidelity digital twin of the person from later analysis of the digital memories, as will be discussed in more detail later herein.

Each digital memory created by the memories creation processing circuitry for the particular person is stored within a memories data store. Hence, over time, the memories creation processing circuitry can generate a database of digital memories for the particular person. The apparatus further provides memories analysis circuitry to determine associations between the digital memories stored in the memories data store, and to maintain a record of those associations. Hence, the apparatus is able to both create a database of digital memories, and associations between those digital memories, and it has been found that through the generation of such data this can facilitate a generic and scalable mechanism for modelling the individual, supporting a wide variety of different use cases.

For example, based on the stored digital memories, and the determined associations between those memories, a high fidelity digital twin of the person can be developed that is able to infer human behaviour, emotion, etc., based on the generated digital memories and associations between those memories. This high fidelity digital twin can then evolve over time, as further digital memories and associations between memories are generated. By such an approach, a wide variety of different cognitive skills can be developed, which can then be used to assist the individual in various settings. Such cognitive skills could for example be used to assist a person in their day-to-day interactions with the world, could support a person who is mentally compromised in some way (for example due to suffering from a neurological disorder such as Alzheimer's disease) when seeking to undertake or relearn certain key skills, could be used to program a robot to act on the individual's behalf for certain activities, etc.

In one example implementation, the given model is arranged to identify relational representations between items of personal data, and the memories creation processing circuitry is arranged to use the relational representations in the given model to determine, with reference to the multiple items of data identified by the augmented given event, the given digital memory. Hence, by reference to the given model, the memories creation processing circuitry can determine how to interrelate the various pieces of data provided by the augmented event, and evaluate which items of data are more important, in the context of creating a digital memory for the given event.

The format of the digital memory can vary dependent on implementation, but in one example implementation each digital memory identifies a memory type and one or more items of personal data pertaining to the digital memory. The memory type can take a variety of forms, and could for example represent a type of emotion such as happy or sad, an inner quality like sensibility which is an indication of capacity for responding to emotions, a cognitive skill such as perception, judgement or executive functioning—which is a person's capability of planning, organising tasks, etc. Whilst in one example implementation the memory type could be determined by the memories creation processing circuitry from the data provided by the augmented event, in an alternative implementation the memory type may itself be one of the data items provided by the augmented event. For example, where one or more of the sensors allow for the generation of raw cognitive data (for example heartbeat, body temperature, pupil dilation, etc.) and have associated processing circuitry for generating processed cognitive data from that raw cognitive data, then the processed cognitive data provided within the augmented event may itself identify the memory type.

The memories creation processing circuitry can be arranged to operate in a variety of different ways. However, in one example implementation the memories creation processing circuitry may be arranged to apply one of a rules based analysis, a machine learning driven analysis, or a hybrid of a rules based analysis and a machine learning driven analysis in order to generate the given digital memory. In one example, the memories creation processing circuitry may leverage built-in ontologies in order to perform hyper contextualisation and association of heterogeneous data as provided in the augmented event The given model that may be used by the memories creation processing circuitry can take a variety of forms. In one example implementation, the given model may be subjected to a training phase prior to use by the memories creation processing circuitry to generate digital memories, wherein the training phase comprises obtaining input from the particular person in order to develop the given model to reflect the particular user's own knowledge.

As an alternative approach, or in addition, at least one model developed for use by the memories creation processing circuitry may be generated from analysis of the personal data generated for the individual. For example, the apparatus may further comprise model creation circuitry to perform an automated analysis of the personal data in the personal data store in order to develop a model for use by the memories creation processing circuitry. The automated analysis may involve the use of machine learning techniques such as deep learning in order to seek to identify patterns in the data, for example to learn correlations between events and actions in the example of an action/task model.

Further, in one example implementation the apparatus may comprise model update circuitry that can be used to refine a model used by the memories creation processing circuitry, based on the data identified by one or more augmented events that were used by the memories creation processing circuitry to generate associated digital memories.

Hence, this provides a form of feedback loop, allowing one or more models to be refined over time to take account of how the data in the augmented events is being used in the creation of digital memories.

The given model that may be used by the memories creation processing circuitry can take a variety of forms, and indeed in some implementations the memories creation processing circuitry may have access to a variety of different models. In one example implementation, the given model may be one of a memories model, an emotion model, an inner quality model, a behavioural model or a cognitive skill model.

In one example implementation, the personal data in the personal data store is timestamped, and the memories creation processing circuitry is arranged, when performing the augmentation process, to seek to identify personal data within the personal data store that was generated at the same time as the given event. It will be appreciated that there can be some flexibility provided in relation to identifying data generated at the same time, and in some implementations a window of time around the time of the given event may be considered when identifying the personal data to be included within the augmented event, thereby including one or more items of personal data that were generated at approximately the same time as the given event.

Further, in one example implementation, the memories creation processing circuitry may be arranged, in response to a query trigger during the augmentation process, to query one or more of the plurality of sensors to obtain additional personal data for use in generating the augmented given event. Such an approach can for example be used to obtain real-time data used to augment the event, or to remove a possible ambiguity in respect of the event. The query trigger could take a variety of forms, but could for example be a trigger generated by the memories creation processing circuitry during the process of performing the augmentation process in order to obtain additional data, or the query trigger could be initiated as a direct result of detection of the event for which a digital memory is to be created, for example where that event is of a particular event type.

The memories analysis circuitry can be arranged to operate in a variety of ways, but in one example implementation is arranged to employ a graph database mechanism to determine and maintain the associations between digital memories. Any suitable graph database mechanism may be used for this purpose. If desired, the memories analysis circuitry may also use a rule-based, model-based or machine learning technique to determine the associations that need to be recorded.

There are various ways in which the memories creation processing circuitry may detect an event for which a digital memory should be generated. In one example implementation, the memories creation processing circuitry may be arranged to detect the given event due to one or more of:

an event trigger resulting from new personal data received for storage in the personal data store;
an event trigger resulting from analysis of the personal data in the personal data store performed by the memories creation processing circuitry;
an event trigger defined by the particular person; and/or
an event triggered by a sensor or associated device.

Hence, the adding of a new item of personal data into the personal data store, and/or an analysis of the personal data in the personal data store (for instance to detect one or more patterns in the data which are indicative of a situation where a new digital memory should be created) may be used as a trigger to generate a digital memory. Alternatively, or in addition, the individual may explicitly ask that a digital memory be created, either at a particular point in time or for a particular type of situation (as a specific example of this latter case, the individual may ask that a digital memory is created for every interaction with his/her mother). As another example, a sensor or associated device may determine from background analysis of the individual that an event has occurred for which a digital memory should be created. For example, augmented reality glasses could trigger an event based on something observed in an image, or a voice analysing sensor could (transparently to the individual) determine that a digital memory should be created based on something that the user has said (that is not itself a direct request from the individual to create a digital memory).

The personal data in the personal data store can take a variety of forms. For example, it may include data relating to external factors relevant to the environment with which the individual is interacting. However, in one example implementation, the personal data may alternatively, or in addition, comprise cognitive data representative of a behavioural state, a biological state, or a combination thereof, of the particular person. The cognitive data may be raw data obtained from one or more cognitive sensors, and/or may be processed cognitive data obtained from a behavioural processing unit based on analysis of the raw cognitive data. Examples of raw cognitive data may be heartbeat, body temperature, pupil dilation, etc., whilst an example of the processed cognitive data could be an emotion data such as happy, sad, fearful, etc.

Such a behavioural processing unit can take a variety of forms, and commonly owned patent publication WO 2019/175569 A1 discusses one suitable form of behavioural processing unit that may be employed. The behavioural processing unit could for example be arranged to use a machine learning technique trained for a certain type of inference, e.g. emotion, attention, planning, decision-making, reminding, etc., in order to generate the processed cognitive data.

In one example implementation, the apparatus further comprises digital twin creation circuitry to develop one or more cognitive skills via analysis of the digital memories stored in the memories data store and the record of the associations between the digital memories, to enable those one or more cognitive skills to be used to assist the particular person. As discussed earlier, by such an approach a high fidelity digital twin of the person can be developed that is able to infer human behaviour, emotion, etc., based on the generated digital memories and associations between those memories. The digital twin can then be used to replicate that behaviour, including for example emotion and decision-making. For instance, the digital twin may be used to associate actions/decisions to emotions in a given context, thus assisting in replicating the behaviour of the individual. This high fidelity digital twin can then evolve over time, as additional digital memories and associations between memories continue to be generated. As discussed earlier, the types of memories generated by the memories creation processing circuitry will be dependent on the model or models referred to by the memories creation processing circuitry when generating the memories. Accordingly, the model or models referred to by the memories creation processing circuitry in one example implementation can be chosen taking into account the cognitive skills that the digital twin creation circuitry will be used to develop based on analysis of the created digital memories, so as to seek to create digital memories that will support such subsequent cognitive skills development.

In one example implementation the digital twin creation circuitry may be arranged to perform a hierarchization process to seek to evaluate the relative importance of the stored digital memories having regard to the one or more cognitive skills being developed, and to maintain an indication of the relative importance of the stored digital memories. For example, by such an approach, the digital twin creation circuitry can be arranged to prioritise memories that relate to certain emotions. There are various ways in which the digital twin creation circuitry may perform such a hierarchization process. It could for example do this based on emotion strength indicated by data captured within individual digital memories, such as heartbeat, body language, or by the more recurringly re-used memories during the cognitive skills synthesis (for example based on the number of times a memory is re-used and/or associated with another memory).

In one example implementation the digital twin creation circuitry may be arranged to perform a cleaning process in respect of relatively low importance digital memories in order to free up storage space for the storage of new digital memories created by the memories creation processing circuitry. For example, a record could be maintained of how frequently certain digital memories are referenced, and memories that are infrequently referenced could be demoted in importance. The manner in which storage space is freed up could vary dependent on implementation. For example, old or unused digital memories could be deleted, or the accuracy of those memories could be reduced over time (for example by reducing the resolution of the information maintained for such old or less important memories).

The manner in which the digital twin creation circuitry is arranged to develop the desired cognitive skills may vary dependent on implementation. However, by way of example, in one implementation the digital twin creation circuitry may be arranged to perform a pattern analysis process to search for patterns in the stored digital memories and the associations between the digital memories, to seek to create knowledge and/or user models for the one or more cognitive skills. Machine learning techniques such as deep learning may be used as part of this process, and/or the process may be guided by the particular person in order to improve fidelity.

In one example implementation, the digital twin creation circuitry may be arranged to generate a feedback signal used to influence a given model used by the memories creation processing circuitry for generation of one or more subsequent digital memories. The way in which the given model is influenced can take a variety of forms. For example, such a feedback signal may be used to adjust a particular model, and/or to seek to identify which of a number of models is most appropriate to use in certain situations.

In one example implementation the apparatus may further comprise context handler circuitry to generate contextual information from the personal data in the data store, and the memories creation processing circuitry may be further arranged to incorporate that contextual information in the augmented given event. This can further improve the memory creation process by associating contextual information with the other data included in the augmented event.

The apparatus can take a variety of forms, but in one example implementation is configured as a confidential computing environment to protect the confidentiality of the particular person. Any suitable computing environments can be used for this purpose, for example those provided through use of the TrustZone and/or realm management extension (RME) products produced by Arm Limited. Cambridge, United Kingdom. If desired, authentication techniques can be employed at both the input and output sides of the apparatus, to make sure that the input data being provided within the augmented events relates to the particular person, thereby preventing the creation of false memories, and also to ensure that any output generated, for example from the earlier-discussed digital twin, is only used in association with the particular person. Any suitable access management technique for attestation (to ensure that the operating platform has not changed and is still trusted), and/or authentication (to make sure that the individual is in fact who he/she claims to be) could be used.

Particular and preferred examples of the techniques described herein will now be discussed with reference to the figures.

FIG. 1 is a block diagram of an apparatus 10 in accordance with one example implementation. The apparatus includes a data store 40 that is used to retain personal data obtained from a variety of different sensors that are used to monitor a particular person (also referred to herein as the individual) for whom it is desired to support the development of a digital twin. The sensors can take a wide variety of different forms, but can generally be considered to relate to different groups 20, 30.

For example, considering the group 20, there may be a plurality of sensors 22, 24, 26 that are used to gather data relating to external factors relevant to the environment with which the individual is interacting. This data could for example include an image representing what the individual is looking at (as for example obtained from a camera worn by the user (either as a dedicated camera or when incorporated within some other device such as augmented reality glasses) or external to the user that is tracking the individual's field of view), a temperature or other environment sensor to detect the environmental conditions around the individual, a GPS or other location sensor to identify the current location of the individual, a clock indication to identify date, and/or time of day, etc. This raw data could be provided "as is" for storing within the data store 40, or may be subject to some interpretation/aggregation function 28 to filter the data from the various sensors in order to determine what data to provide to the data store. Such an interpretation/aggregation function 28 could be arranged to take into account how the data will be used by the apparatus 10, and hence for example take into account the various forms of digital memories that may be created by the apparatus in dependence on the data, and the forms of data that will be useful for that process.

In addition, considering the group 30, there may be a plurality of sensors 32, 34, 36 that are used to gather cognitive data representative of a behavioural state, a biological state, or a combination thereof, of the particular person. Such sensors could take a variety of forms, but could for example detect a heartbeat, body temperature, pupil dilation, etc. Further, a brain computer interface (BCI) sensor could be used to obtain brainwave information. Such raw cognitive data could be provided "as is" for storing within the data store 40 or, as with the external factor data, may be subject to some interpretation/aggregation function 38 that can be arranged to filter the data from the various sensors in order to determine what data to provide to the data store, and could be arranged to take into account how the data will be used by the apparatus 10.

The interpretation/aggregation function 38 may involve the use of a behavioural processing unit 39 that can perform various interpretation and aggregation tasks. Such a behavioural processing unit 39 could for example be arranged to perform a machine learning process in order to produce processed cognitive data from the raw cognitive data, for instance if it has been trained for a certain type of inference, for example to detect emotion, attention, planning, decision-making, etc. based on combinations of raw cognitive data. It may also perform aggregation to fuse data and/or tag data produced by different sensors and to provide metadata from a mix of the data produced by such sensors. Any suitable behavioural processing unit may be used for this purpose, but an example of such a unit that could be used is described in commonly owned co-pending patent publication WO 2019/175569, the entire contents of which are hereby incorporated by reference.

As shown in FIG. 1, the apparatus 10 includes memories creation processing circuitry 45 (which may also be referred to herein as a memories creation processing engine) that is arranged, on detection of an event for which a digital memory should be created, to perform an augmentation process in order to generate an augmented event that includes multiple items of data associated with that event, those multiple items of data including various items of personal data retrieved from the data store 40 that are associated with that event. If desired, context handler circuitry 55 (also referred to herein as a context handler engine) may be arranged to generate contextual information from the personal data in the data store, and provide that contextual information to the memories creation processing circuitry 45 for inclusion as part of the data forming the augmented event. The memories creation processing circuitry 45 is then arranged to analyse the data provided by the augmented event (in one example implementation it does this with reference to one or more models stored in the models storage 50), in order to generate a digital memory for the event, which is then stored within the memories data store 60. The operation of the memories creation processing circuitry 45 will be described in more detail later with reference to FIG. 2.

As a result of the process described above, it will be appreciated that, over time, a database of digital memories for the individual will be established within the memories data store 60. Memories analysis circuitry 65 (which may also be referred to herein as a memories analysis engine) can be arranged to analyse the digital memories stored in the memories data store in order to determine associations between those memories, and then to maintain a record of those associations. This process will be discussed in more detail later with reference to FIG. 5A and FIG. 5B.

It has been found that through the creation of a database of digital memories, and associations between those digital memories, this can facilitate a generic and scalable mechanism for modelling the individual, supporting a wide variety of different use cases. In particular, as shown in FIG. 1, digital twin creation circuitry 70 (also referred to herein as a digital twin creation engine) can be arranged to analyse the digital memories and the record of associations between those digital memories in order to develop certain chosen cognitive skills, with those cognitive skills then being available to use in a wide variety of different ways to assist the individual. By such an approach, a high fidelity digital twin of the individual can be developed that is able to infer human behaviour, emotion, etc., and this high fidelity digital twin can then evolve over time as further digital memories and associations between the memories are generated. The operation of the digital twin creation circuitry 70 will be discussed in more detail later with reference to FIG. 6.

As example use cases of the cognitive skills developed by such a process, they may be used to assist the individual in their interactions with the world. Based on the knowledge provided by memories of past events, and the associations between those memories, such a process can make judgements about how the individual interacts with the world, thereby providing the ability to solve problems and act on behalf of the individual in certain circumstances, for example performing grocery shopping tasks, assisting in the playing of a video game, cooking, etc. Being able to perceive the world from the perspective of the individual and recall relevant memories will enable the digital twin to act efficiently on the individual's behalf, whether passively in the background, or when prompted by the individual (for example where the individual may wish to enter the passcode for a key lock and the digital twin can remind the individual of the number used for that lock). The digital twin may also be able to perform executive functioning tasks on behalf of the individual, such as planning, organisation, task initiation, time management, attention, evaluating priorities, problem solving, etc.

It may also be possible to train the digital twin on aspects of perception and judgement based on the analysis performed with respect to the digital memories and their associations. Perception is a cognitive process that allows people to take in information through their senses (sensation) and then utilise this information to respond and interact with the world. Perception may occur in multiple stages, for example stimulation, organisation, interpretation/evaluation, memory and recall. Such a process makes it possible for an individual to advance in their environment and interact with it. Such steps could be used as a subcomponent for a decision-making process, with the digital twin being able to undertake one or more of the steps on behalf of the individual.

The essence of cognition is judgement, which occurs when a certain object is distinguished from other objects and is characterised by some concept or concepts, allowing the individual to make decisions and judgements about things they have processed. Such a process may involve comparing new information with prior knowledge, and integrating this information into existing ideas or even replacing old knowledge with new knowledge. Such a process could for example enable the human digital twin to act on the individual's behalf in certain situations, for example when performing tasks with low consequentiality.

The models provided within the models storage 50 can take a variety of forms. For example, one or more of the models may be subject to a training phase prior to its use by the memories creation processing circuitry 45, w % here the training phase comprises obtaining input from the individual in order to develop the model to reflect the particular user's own knowledge. However, if desired, model creation circuitry 75 (also referred to herein as a model creation engine) may also be provided to perform some automated analysis of the personal data in the personal data store 40 in order to develop one or more models for storage within the models storage 50, for subsequent access by the memories creation processing circuitry 45.

If desired, model update circuitry 75 (also referred to as a model update engine) may be employed to refine one or more of the models stored in the models storage 50 based on the data identified by augmented events used by the memories creation processing circuitry 45 to generate associated digital memories. This hence provides a feedback mechanism, allowing certain models to be refined over time to take account of how the data in the augmented events is being used in the creation of digital memories. The model update circuitry may be provided separately to the model creation circuitry, or (as per the example in FIG. 1) both the creation and update mechanisms could be implemented by the same circuitry/engine.

As also shown in FIG. 1, the model creation/update circuitry 75 may receive a feedback signal from the digital twin creation circuitry 70. Such a feedback signal may be used to influence the given model used by the memories creation processing circuitry 45 for the generation of one or more subsequent digital memories, for example by adjusting a particular model, and/or by seeking to identify which of a number of models is most appropriate to use in certain situations.

The apparatus 10 can take a variety of forms, but in one example implementation is configured as a confidential computing environment to protect the confidentiality of the particular person. As mentioned earlier, any suitable computing environments can be used for this purpose, and if desired authentication techniques can be employed at both the input and output sides of the apparatus, to make sure that the input data being provided within the augmented events relates to the particular person, thereby preventing the creation of false memories, and also to ensure that any output generated, for example from the earlier-discussed digital twin, is only used in association with the particular person.

In FIG. 1 distinct circuit blocks are illustrated in association with each of the above described functions performed by the apparatus 10. Whilst dedicated circuitry could be developed to implement each of these functions, it will be appreciated that in accordance with an alternative implementation those functions may be performed by software executing on one or more processing units of a general purpose computer.

Figure 2:
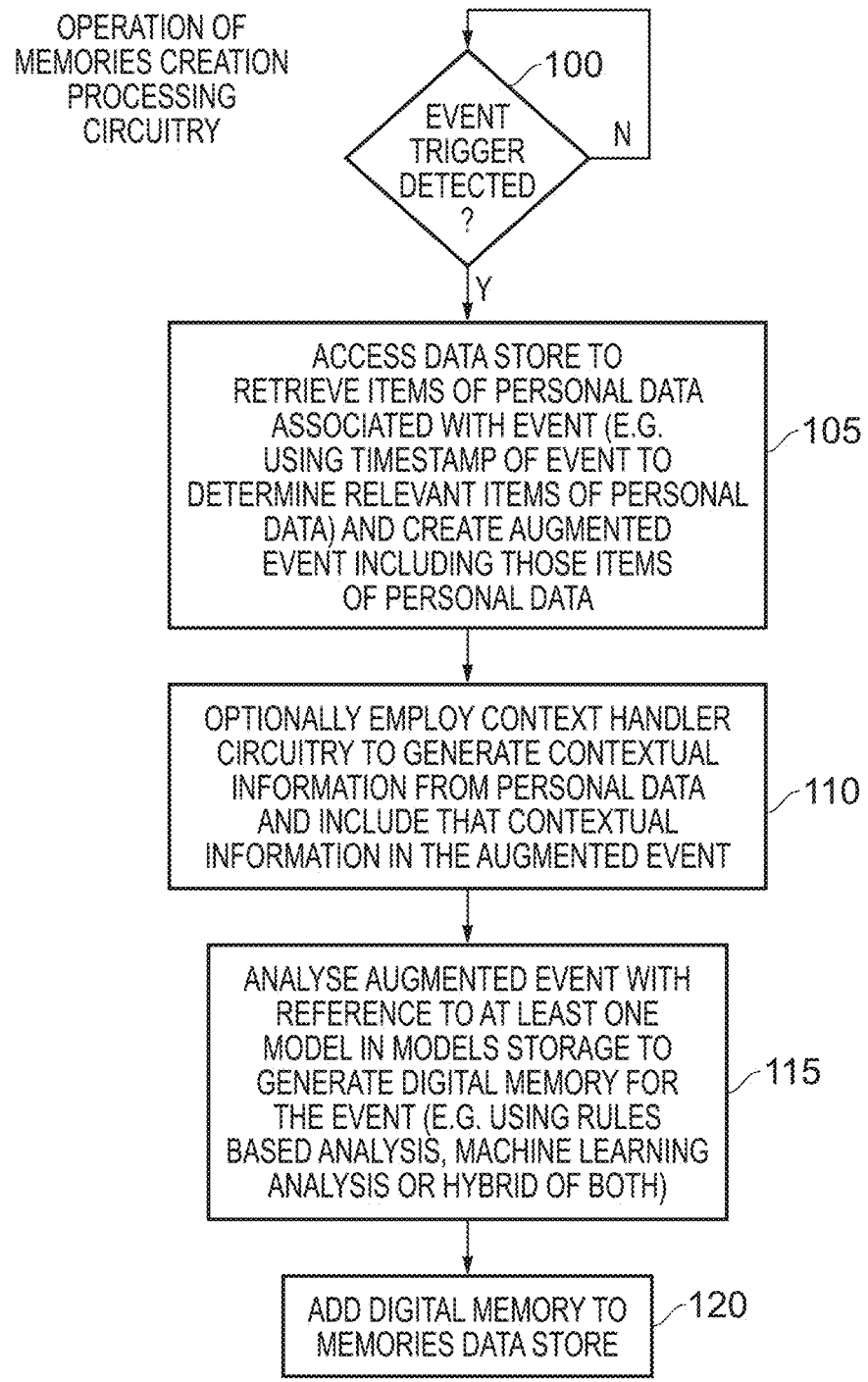
FIG. 2 is a flow diagram illustrating the operation of the memories creation processing circuitry/engine of FIG. 1 in accordance with one example implementation.

FIG. 2 is a flow diagram illustrating the operation of the memories creation processing circuitry 45 of FIG. 1, in accordance with one example implementation. At step 100, it is determined whether an event trigger has been detected. As discussed earlier, such an event trigger can take a variety of forms, and hence for example could occur on adding a new item of personal data into the personal data store 40, and/or based on an analysis of the personal data in the personal data store (for instance where that analysis identifies a pattern in the data that is indicative of a situation where a new digital memory should be created). Alternatively, or in addition, the individual may explicitly ask that a digital memory be created, or a sensor or associated device may determine from background analysis of the individual that an event has occurred for which a digital memory should be created.

Once an event trigger has been detected, then at step 105 the memories creation processing circuitry 45 can be arranged to access the data store 40 in order to retrieve items of personal data associated with the event. There are a number of ways in which this step can be performed. For example, assuming the various items of personal data stored in the data store have an associated timestamp, then based on a timestamp of the event it can then be determined which items in the personal data store are relevant to that event. The data retrieved from the data store can then be used to create an augmented event that includes various items of personal data retrieved from the data store 40.

If desired, during this process the memories creation processing circuitry 45 may also send a query to one or more sensors in order to obtain additional personal data for use in generating the augmented event. Such additional data may be used for a variety of purposes, for example to remove a possible ambiguity in respect of the event, or to obtain additional real-time data that is included within the augmented event.

As indicated by step 110, during the augmentation process, the context handler circuitry 55 may also be invoked to generate contextual information from one or more of the items of personal data within the data store 40, so that that contextual information can then be included in the augmented event. There are a number of known techniques for performing context analysis on data, and any suitable one of those techniques could be used to implement the function of the context handler circuitry 55. Purely by way of specific example as to the sort of functionality that the context handler circuitry could perform, it might determine from the personal data in the data store that the individual is leaving his/her house, and that based on the day of the week and the time, the user is leaving for work, and could then generate contextual information relevant to such an activity, for example by producing details relevant to the journey to work.

Once the augmented event has been generated, then at step 115 the memories creation processing circuitry 45 analyses that augmented event with reference to one or more of the models in the models storage 50. For instance, the chosen model or models may identify relational representations between various items of personal data, and those relational representations can be used to determine, with reference to the multiple items of data identified by the augmented event, the appropriate form of digital memory to generate. Hence, with reference to such a model or models, the memories creation processing circuitry can determine how to interrelate the various pieces of data provided by the augmented event, and evaluate which items of data are more important when creating a digital memory for the current event.

The model selected for use may depend on circumstances applicable to the event under consideration, for example the type of memory to be generated. For example, particular models may be appropriate to particular tasks. Sometimes it may be appropriate to refer to more than one model when generating a single digital memory, or indeed in some instances multiple different digital memories may be generated for the same event, for example by using a different model for each generated digital memory. These multiple different digital memories for the same event could then be filtered, and certain memories demoted or deleted, by the digital twin creation circuitry 70 in due course.

As shown in FIG. 2, once the digital memory has been generated, the process proceeds to step 120 where the digital memory is added to the memories data store 60 for future reference.

FIG. 3 schematically illustrates the format of a digital memory 150 that may be stored within the memories data store 60. The digital memory 150 comprises a number of fields, each field providing certain information. For example, a timestamp field 155 may be provided to identify a date and time associated with the digital memory. This can be useful when seeking to retrieve memories, or when making associations between memories. The timestamp may in some instances effectively provide a unique identifier for the digital memory, either by itself, or in combination with one or more of the other data fields within the digital memory.

As an example of another field that may be provided, a memory type field 160 may be provided to indicate the type of digital memory. The memory type can take a variety of forms, and could for example represent a type of emotion such as happy or sad, an inner quality like sensibility which is an indication of capacity for responding to emotions, a cognitive skill such as perception, judgement, or executive functioning—which is a person's capability of planning, and organising tasks, etc. As discussed earlier, the memory type could be determined by the memories creation processing circuitry 45 in some implementations, but alternatively may be provided as one of the items of data within the augmented event, for example where the earlier-discussed behavioural processing unit 39 is used to analyse raw cognitive data in order to generate processed cognitive data.

As indicated by the reference numeral 165, various other fields may be provided within the digital memory 150 to capture other relevant items of personal data that are used to define the digital memory. The items of data captured here will depend on the digital memory in question, but could for instance identify a variety of external factor data and/or cognitive data, for example a location, an image viewed by the individual at that location, any key persons or objects within that image, temperature or environmental information associated with the location, heartbeat information, body temperature information, etc. Still further examples of data that could be captured within the digital memory would be the person's attitude, for example whether positive or negative (which could be detected by a Behavioural Processing Unit (BPU) or by a biological signal from a suitable sensor), an indication of the person's social interaction, for example is he/she interacting with people (which could for example be inferred by identifying that the person is talking to someone who is looking at them/paying attention), who the person is that is being interacted with (for example is he/she a known family member, a work colleague or an unknown person), an indication of the key topic of discussion (for example Covid, sport, children, as may be inferred by natural language processing (NLP)), a type of interaction with objects, etc.

Figure 4A:
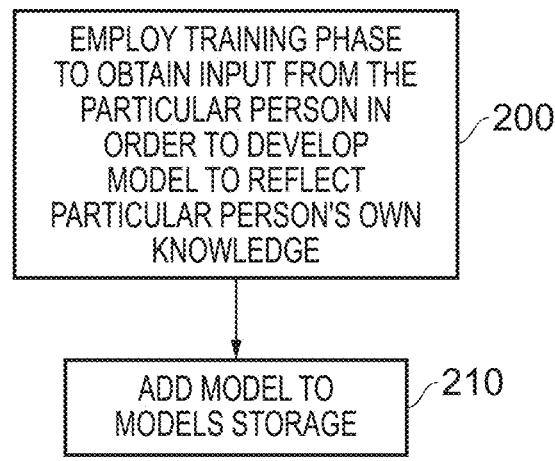
FIGS. 4A and 4B are flow diagrams illustrating techniques that may be employed in order to generate and maintain models for use when performing the techniques described herein, in accordance with example implementations.

FIG. 4A is a flow diagram illustrating one technique that may be used to develop a model for provision within the models storage 50 for future reference by the memories creation processing circuitry 45. In accordance with this example, at step 200, a training phase is employed in order to obtain input from the individual being modelled, in order to develop a model that reflects the particular person's own knowledge. Hence, in accordance with such an approach, the model is effectively developed off-line, and then at step 210 that model is added to the models storage 50, whereafter it can be referenced by the memories creation processing circuitry 45 when creating future digital memories.

Figure 4B:
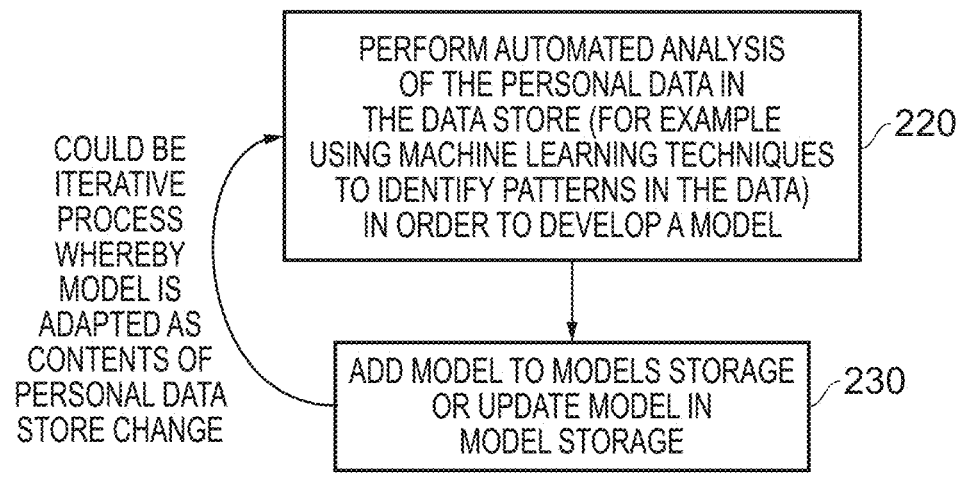

An alternative approach is shown by the flow diagram of FIG. 4B, where a model is developed in an automated manner with reference to the personal data stored in the data store 40. At step 220, an automated analysis of the personal data in the data store is performed using any suitable technique. For example, machine learning techniques may be used at this point to seek to identify patterns in the data, and then develop a model based on that analysis. As a particular example, such an approach may be used to seek to identify correlations between events and actions in the example of an action/task model.

At step 230, the model as developed at step 220 is added to the models storage 50 for subsequent use by the memories creation processing circuitry 45. As indicated in FIG. 4B, this process could be iterative, such that a model initially developed using such an automated analysis is then later adapted to take into account changes in the contents of the personal data store. This hence allows the model to adapt over time to take account, for example, of how the data in the augmented events is being used in the creation of digital memories. During such an iterative process, it will be appreciated that step 230 involves updating the model in the models storage 50 rather than storing a new model into the models storage.

Figure 4C:
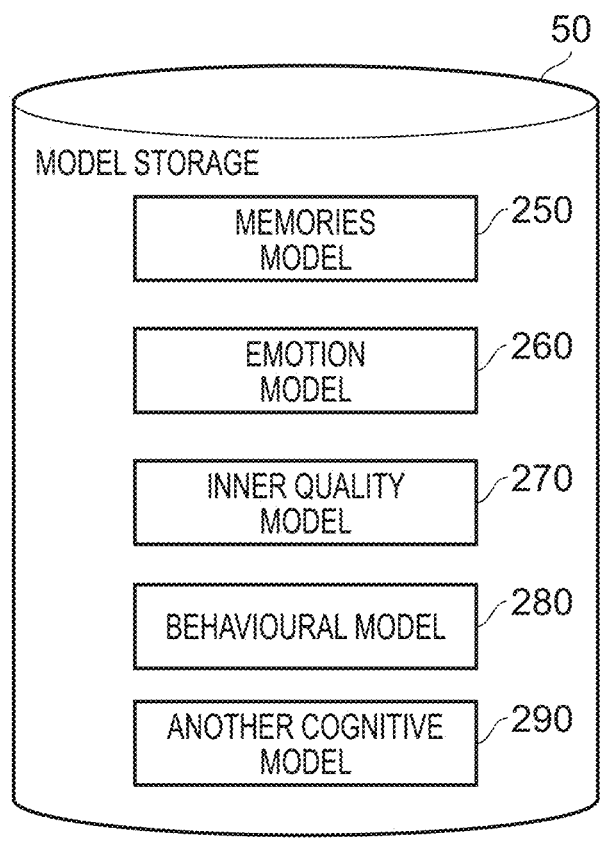
FIG. 4C schematically illustrates various different forms of models that may be used when employing the techniques described herein.

There are a wide variety of different models that could be provided within the model storage 50 for reference by the memories creation processing circuitry 45. FIG. 4C schematically illustrates various different types of models that may be provided, in this example these including a memories model 250, an emotion model 260, and inner quality model 270, a behavioural model 280, and potentially one or more cognitive skill models 290.

As will be apparent to a person of ordinary skill in the art, such models can take a variety of forms. A memories model 250 aims to collect stimuli, for example smell, taste, etc., and to associate context with that stimuli that can then form memories that are triggered when that stimuli is presented in the future. For example, a memories model may be represented by the relation between a detected emotion and image-video of a gesture/posture, a sound, a location, a colour, a smell, a taste, etc. A specific example may be referred to as the Madeleine of Proust model, where when Madeleine drinks tea that taste triggers recollection of an event in time (for example his childhood) and a social interaction (for example with his aunt Leonie) and may also trigger other memories such as a place (for example his aunt's room in the village of Combray), and a mix of emotions (for example happiness, family love, tasting pleasure). A similar process can be used to develop an emotion model 260, where memories are associated with particular emotions, such as whether the person is happy, sad, fearful, etc.

As an example of an inner quality model 270, a sensibility model could be developed. A definition used to define such a model could be: the quality of being able to appreciate and respond to complex emotional or aesthetic influences. Such a model could have application in areas such as health and wellness. With such a form of inner quality model, the template could look for the following information:
1. Stimuli
   a. Social interaction:
      i. Is the person interacting with people? (inferred by "he/she is talking to someone looking at him/her or paying him/her attention"); who is it? (known—e.g. he/she is my family, a work colleague, . . . ; or unknown);
      ii. The topic: what is the person talking about? (Covid, sport, children, . . . for example inferred by NLP).
   b. Other type of interaction with the world.
2. The person's attitude: positive or negative; he/she thinks this is a good or bad thing to do/not to do (could be detected by the BPU or by a biological signal).
3. Emotion: the person's emotion type (detected by the BPU or other bio-signal).
4. Change in emotion: The person's reaction to the stimuli (e.g. reaction to someone crying/laughing, being hurt . . . ) with a score high/low on the reaction.

If such a model used, the memories analysis circuitry 65 could in due course search for similar memories when certain stimuli (e.g. $3^{rd}$ party emotion) generated a similar high reaction. Further, the digital twin creation circuitry 70 could in due course explore possible positive and negative reinforcement of past sensibility related experience. After a while this can establish a range of stimuli associated to a scale of sensibility (the person is highly sensitive to X, Y, Z, and not at all to . . . . )

As an example of a behavioural model 280, a behavioural detection model could be used, where the template may look for the following information:
1. Environmental context: the area in which the event happened, e.g. school, work place, local shops and facilities, and local weather conditions (this could be inferred by geographical location and current conditions at this location—temperature/weather)
2. Social interaction:
   a. Is the person interacting with people? (inferred by "He/she is talking to someone looking at him/her or paying him/her attention"): who is it? (known—e.g. he/she is my family, a work colleague, . . . ; or unknown);
   b. The topic: what is he/she talking about? (Covid, sport, children, . . . for example inferred by NLP).
3. The person's attitude: positive or negative; he/she thinks this is a good or bad thing to do/not to do (could be detected by the BPU or by a biological signal).
4. Emotion: emotion type (for example detected by the BPU or by a biological signal).
5. Object interaction: type of object the person is touching (e.g. food, fork, squash shoes, coffee cup, house keys, . . . ), how is the person interacting with it (carefully, smashing it, throwing it, using it to interact with other objects and perform task—e.g. fork, knife, racket, . . . ) (may for example be inferred by computer vision in combination with machine learning based object detection). Such techniques may want a way to distinguish between the object the person is using and other objects in the scene, and this may be possible for example by using machine learning pre-screening techniques.
6. Type of activity: sport, work, leisure, relaxation, knowledge creation, driving, shopping, . . . unknown/new . . . .
7. Perception: it is difficult or easy to do: it is something the person knows how to do or not (thus the person has to be taught or to find a way to learn).
8. "stage of change model": contemplation, preparation, action, maintenance, termination (this may be part of a reinforcement learning stage, so could come in a second phase of development of the model).

If such a model used, the memories analysis circuitry 65 could in due course search for memories where the person has been observing and learning from others a similar task/activity/topic, and then link them together. Further, the digital twin creation circuitry 70 could in due course be used to explore possible positive and negative reinforcement of behavior. It could hence for example search for similar memories (determined by a similar score on each component), to try to identify a range of intention and a specific attitude which leads to similar behavior, for example the person is taking the stairs instead of the lift (behaviour), the person knows stairs enable him/her to do easily/regularly some sport so could make them healthier (attitude), the person wants to lead a healthier life (intention).

Considering an example of a cognitive model 290, one example would be a perception model. "Perception" is a cognitive process that allows people to take in information through their senses (sensation) and then utilize this information to respond and interact with the world. Perception occurs in five stages: stimulation, organization, interpretation-evaluation, memory and recall.

A perception detection model could be developed for storing within the model storage 50, where a template for such a model could look for the following information. In a first generation of such a model, perception could be simplified to the stimulation/organization stage, and thus the model may include:
   a. Environmental stimuli: visual, audio, etc., . . . leveraging machine learning classification (for example keyword spotting (KWS), natural language processing (NLP), Computer Vision image classification, etc.);
   b. Organization: for instance, this is known (e.g. this keyword or topic exists in the database, the task has been performed before—e.g. eating, biking) versus this is a new task (e.g. new keyword, new activity with new objects, for example first time the person is reacting to a car horn);
   c. Decision: what has the person decided to do "He/she used a bucket of water, to pour on fire"; he/she used the stairs, not the lift.

In a second generation of the model, interpretation-evaluation could be added, as could environmental context:
   d) interpretation-evaluation: this is easy or difficult to do (task was done in few seconds without effort versus it took a lot of time and the person was suffering/yelling/complaining/looking for help).
   e) Environmental context: for instance the area in which the event happened, for example school, work place, a specific event like a birthday, etc. (this could be inferred by geographical location).

If such a model used, the memories analysis circuitry 65 could in due course search for similar memories where stimuli generated a similar decision. Further, the digital twin creation circuitry 70 could in due course be used to explore possible positive and negative reinforcement of perception. Adding a causality dimension to the memory (which for example is possible if context is captured in the memories) can assist here. For example, it may be determined that smoke relates to fire or something burning. The action taken may depend on the context. For example, if the person smells smoke at home in the kitchen, the action may be to look for the cause (e.g. oven, toaster, etc.) and turn that device off, or in some instance to pour on water to a fire source. However, if at work, the action may be to evacuate the building. Hence, the context can provide an explanation as to why the same stimuli does not always create the same decision.

As another example of a cognitive model, an executive functioning model may be developed. Such a model could for example be useful in the areas of planning, organization, task initiation, time management, attention, evaluating priorities, problem solving, self-control, etc., which are essentially various types of life skills. Use of such a model may hence be beneficial when seeking to develop a personal assistant to act on a person's behalf, for example a robot to act on the person's behalf for certain organizational tasks.

In one example of such an executive functioning model, the template may look for the following information:
1. Environmental context: for instance, the area in which the event happened, for example school, work place, a specific event like a birthday, etc. (this could be inferred by geographical location).
1. Type of activity: sport, work, leisure, relaxation, knowledge creation, driving, shopping, . . . unknown/new . . . .

2. Social interaction:
   a. Keep only info about who the person interacts with (e.g. parents of a friend of the person's child, colleagues from the company where the person works), and when those interactions took place
   b. The topic: what is being discussed? (Covid, sport, children, ... which could for example be inferred by NLP)
   c. Planning information: is the person proposing a specific activity (invitation for dinner, anniversary, work travel)
   d. 3$^{rd}$ party preferences—they like games, certain food, etc.
3. The person's attitude: positive or negative (could be detected by the BPU or by a biological signal)
4. Emotion: emotion type (detected by the BPU or by a biological signal)

If such a model used, the memories analysis circuitry 65 could in due course search for memories where the person has been planning something, and also create a graph for people (all memories relating to the persons work colleagues, etc.). Further, the digital twin creation circuitry 70 could in due course be used to pre-organize future events (e.g. dinner, birthday celebrations (for example organizing the person's son's 7$^{th}$ birthday on the person's behalf—his friends are . . . , they all love Harry Potter, this is June so weather should be good, we could do externally but it may be hot so we need drinks and a tent, . . . ). In such a scenario the digital twin creation engine may be able to propose options.

Figure 5A:
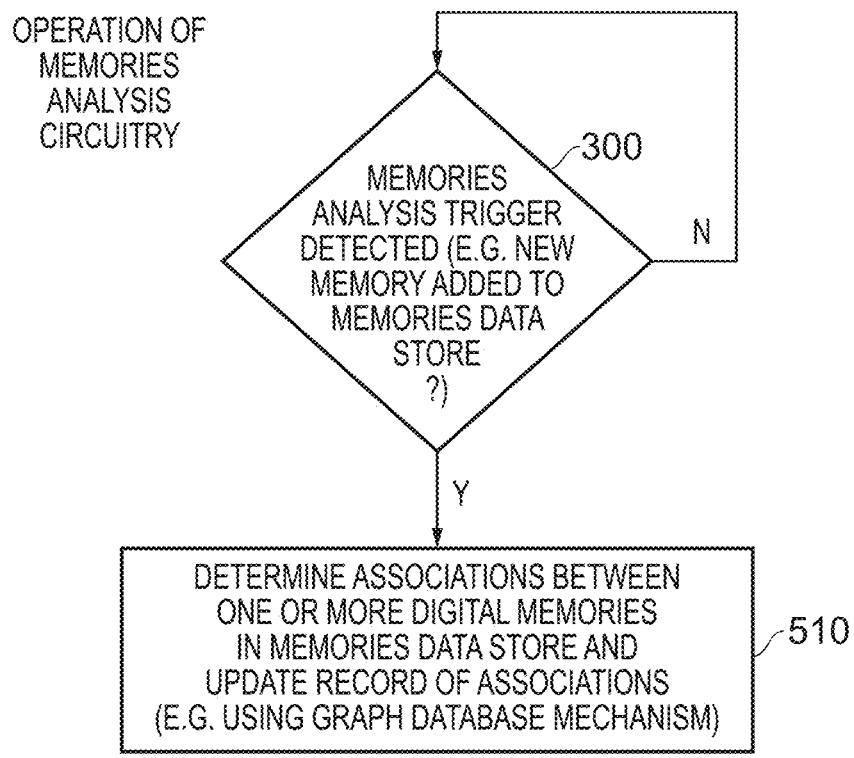
FIG. 5A is a flow diagram illustrating the operation of the memories analysis circuitry/engine of FIG. 1 in accordance with one example implementation, whilst FIG. 5B schematically illustrates how memories may be associated with each other by virtue of the technique employed by the memories analysis circuitry/engine.

FIG. 5A is a flow diagram illustrating the operation of the memories analysis circuitry/engine 65 in accordance with one example implementation. At step 300, it is determined whether a memories analysis trigger has been detected. This can take a variety of forms, but a trigger could for example be detected each time a new digital memory is added to the memories data store 60. Alternatively, the trigger may occur at periodic intervals, in order to trigger the analysis of the memories stored within the memories data store 60.

Once such a memories analysis trigger has been detected, the process proceeds to step 510 where the memories analysis circuitry is arranged to analyse the digital memories in the memories data store in order to determine associations between those memories, and to then update a record of those associations maintained for the memories in the memories data store. This association information may be stored in a separate storage structure, or within the memories data store 60. In one example implementation, a graph database mechanism can be employed to determine and maintain the associations between digital memories. If desired, the memories analysis circuitry may also use a rule-based, model-based or machine learning technique to determine the associations that need to be stored.

It will be appreciated that the process employed at step 510 may not merely result in the creation of new associations for any new digital memories added to the memories data store 60 since the last time the analysis was performed by the memories analysis circuitry 65, but indeed the addition of such new digital memories may affect or alter one or more previously determined associations between pre-existing memories. Hence, the associations between the digital memories can evolve over time to take into account new digital memories added into the memories data store.

Figure 5B:
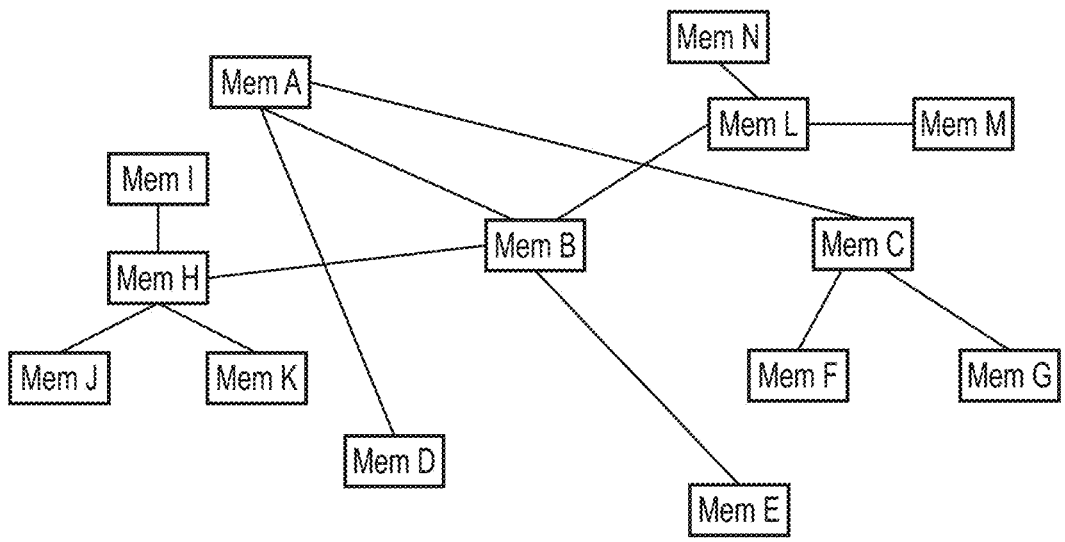

FIG. 5B is a diagram schematically illustrating how associations between individual digital memories may be maintained using a suitable graph database mechanism. As will be appreciated, a complex network of associations between memories can be captured. It will be appreciated that many types of associations may be detected and tracked, but purely by way of one simple example, the memories analysis circuitry may detect two or more happiness related memories that have occurred within a certain period of time, and then associate those memories with each other. This may for example identify that a particular day has been a good/pleasant day for the individual.

Figure 6:
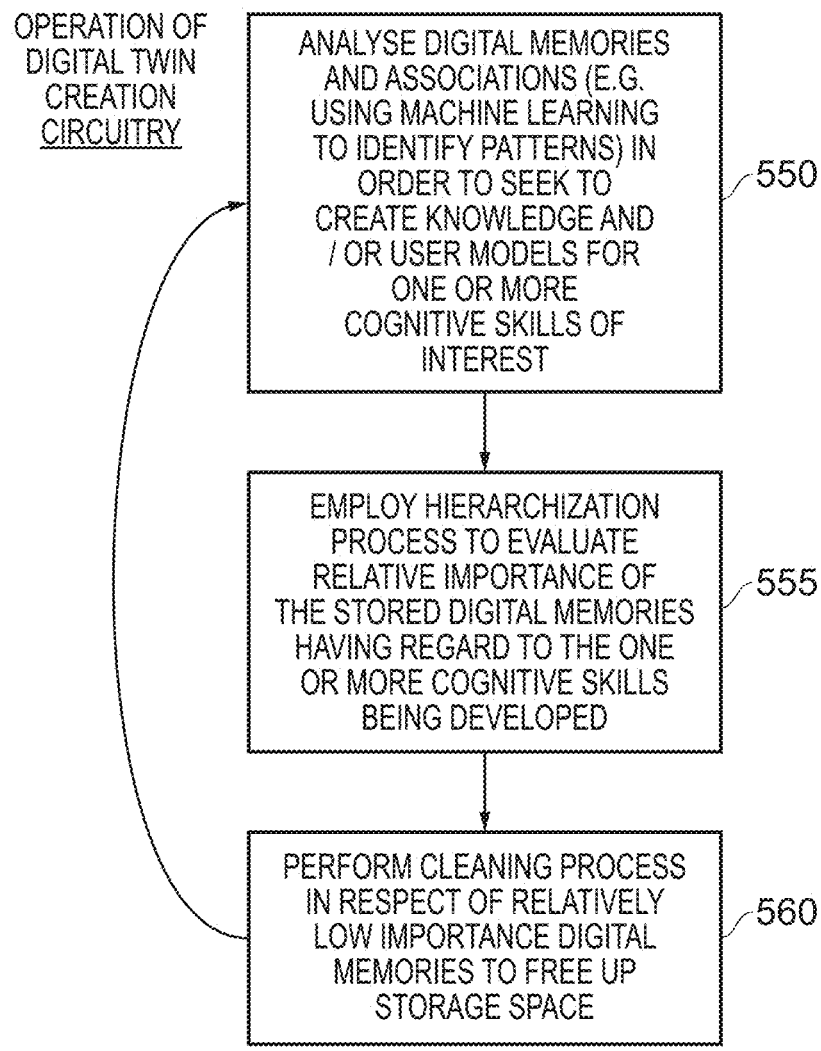
FIG. 6 is a flow diagram illustrating the operation of the digital twin creation circuitry/engine of FIG. 1 in accordance with one example implementation.

FIG. 6 is a flow diagram illustrating the operation of the digital twin creation circuitry/engine 70 in accordance with one example implementation. As indicated by step 550, the digital twin creation circuitry 70 can be used to analyse the digital memories in the memories data store 60 along with the associations between those memories determined by the memories analysis circuitry 65, in order to seek to create knowledge and/or user models for one or more cognitive skills of interest. In one example implementation, a machine learning technique may be employed to seek to identify patterns in the memories and associations, and based on those detected patterns create the knowledge and/or user models. By such an approach, a high fidelity digital twin of the individual can be developed that is able to infer human behaviour, emotion, etc., and hence can later be used to replicate that behaviour, or aspects of that behaviour. The high fidelity digital twin can then evolve over time, as additional digital memories and associations between memories continue to be generated.

As indicated by step 555, the digital twin creation circuitry can also employ a hierarchization process to seek to identify the relative importance of the memories stored within the memory data store 60 having regard to the one or more cognitive skills that are being developed. For example, memories associated with certain emotions could be prioritised. This process hence aims to replicate human behaviour, where certain memories are viewed as being more important than others, and are prioritised based on particular cognitive skills. There are various ways in which this process could be performed. In one example implementation, this may be based on an indication of emotion strength determined for example with reference to heartbeat data, body language, or by the more recurringly re-used memories during the cognitive skills synthesis (for example based on the number of times a memory is re-used and/or associated with another memory).

As indicated by step 560, the digital twin creation circuitry 70 may also perform a cleaning process in respect of relatively low importance digital memories in order to free up storage space. For example, memories that are infrequently referenced could be demoted in importance. If desired, old or unused digital memories could at some point be deleted, or the accuracy of those memories could be reduced over time by reducing the resolution of the information maintained for such memories.

As shown in FIG. 6, this process may be iterative, so that the digital twin evolves over time taking into account further digital memories and associations that are added to the memories data store, and taking into account any digital memories that have been demoted or deleted. Whilst steps 550, 555 and 560 have been shown sequentially for ease of illustration, it will be appreciated that in alternative implementation these steps may be performed in parallel, with each step being repeated at periodic intervals, or in response to associated triggers.

Other example arrangements set out in the following clauses:

1. An apparatus comprising:
    a data store to store personal data derived from signals gathered from a plurality of sensors used to monitor a particular person;
    memories creation processing circuitry, responsive to detection of a given event associated with the particular person:
        to perform an augmentation process during which the memories creation processing circuitry is arranged to generate an augmented given event identifying multiple items of data associated with the given event, including at least items of personal data associated with the given event obtained from the data store; and
        to analyse the multiple items of data identified by the augmented given event in order to generate a given digital memory for the given event;
    a memories data store to store digital memories generated by the memories creation processing circuitry for the particular person; and
    memories analysis circuitry to determine associations between the digital memories stored in the memories data store and to maintain a record of those associations.
2. An apparatus according to Clause 1, wherein the memories creation processing circuitry is arranged to analyse the multiple items of data identified by the augmented given event, with reference to a given model, in order to generate the given digital memory for the given event.
3. An apparatus according to clause 2, wherein the given model is arranged to identify relational representations between items of personal data, and the memories creation processing circuitry is arranged to use the relational representations in the given model to determine, with reference to the multiple items of data identified by the augmented given event, the given digital memory.
4. An apparatus according to any preceding clause, wherein the given digital memory identifies a memory type and one or more items of personal data pertaining to the given digital memory.
5. An apparatus according to any preceding clause, wherein the memories creation processing circuitry is arranged to apply one of a rules based analysis, a machine learning driven analysis, or a hybrid of a rules based analysis and a machine learning driven analysis in order to generate the given digital memory.
6. An apparatus according to any of clauses 2 to 5 when dependent on clause 2, wherein the given model is subjected to a training phase prior to use by the memories creation processing circuitry to generate digital memories, wherein the training phase comprises obtaining input from the particular person in order to develop the given model to reflect the particular user's own knowledge.
7. An apparatus according to any of clauses 2 to 5 when dependent on clause 2, further comprising model creation circuitry to perform an automated analysis of the personal data in the personal data store to develop the given model.
8. An apparatus according to any of clauses 2 to 5 when dependent on clause 2, further comprising model update circuitry to refine the given model based on the data identified by one or more augmented events used by the memories creation processing circuitry to generate associated digital memories.
9. An apparatus according to any of clauses 2 to 5 when dependent on clause 2, wherein the given model is one of a memories model, an emotion model, an inner quality model, a behavioural model, or a cognitive skill model.
10. An apparatus according to any preceding clause, wherein the personal data in the personal data store is time stamped, and the memories creation processing circuitry is arranged, when performing the augmentation process, to seek to identify personal data within the personal data store that was generated at a same time as the given event.
11. An apparatus according to clause 10, wherein the memories creation processing circuitry is arranged, in response to a query trigger during the augmentation process, to query one or more of the plurality of sensors to obtain additional personal data for use in generating the augmented given event.
12. An apparatus according to any preceding clause, wherein the memories analysis circuitry is arranged to employ a graph database mechanism to determine and maintain the associations between digital memories.
13. An apparatus according to any preceding clause, wherein the memories creation processing circuitry is arranged to detect the given event due to one or more of:
    an event trigger resulting from new personal data received for storage in the personal data store;
    an event trigger resulting from analysis of the personal data in the personal data store performed by the memories creation processing circuitry;
    an event trigger defined by the particular person;
    an event triggered by a sensor/device.
14. An apparatus according to any preceding clause, wherein the personal data in the personal data store comprises at least cognitive data representative of a behavioural state, a biological state, or a combination thereof, of the particular person.
15. An apparatus according to clause 14, wherein the cognitive data is raw cognitive data obtained from one or more cognitive sensors or processed cognitive data obtained from a behavioural processing unit based on analysis of the raw cognitive data.
16. An apparatus according to clause 14 or clause 15, wherein the personal data in the personal data store further comprises data about external factors associated with the particular person.
17. An apparatus according to any preceding clause, further comprising:
    digital twin creation circuitry to develop one or more cognitive skills via analysis of the digital memories stored in the memories data store and the record of the associations between the digital memories, to enable those one or more cognitive skills to be used to assist the particular person.
18. An apparatus according to clause 17, wherein the digital twin creation circuitry is arranged to perform a hierarchization process to seek to evaluate the relative importance of the stored digital memories having regard to the one or more cognitive skills being developed and to maintain an indication of the relative importance of the stored digital memories.
19. An apparatus according to clause 18, wherein the digital twin creation circuitry is arranged to perform a cleaning process in respect of relatively low importance digital memories in order to free up storage space for the storage of new digital memories created by the memories creation processing circuitry.

20. An apparatus according to any of clauses 17 to 19, wherein the digital twin creation circuitry is arranged to perform a pattern analysis process to search for patterns in the stored digital memories and the associations between the digital memories, to seek to create knowledge and/or user models for the one or more cognitive skills.

21. An apparatus according to any of clauses 17 to 20, wherein the digital twin creation circuitry is arranged to generate a feedback signal used to influence a given model used by the memories creation processing circuitry for generation of one or more subsequent digital memories.

22. An apparatus according to any preceding clause, further comprising context handler circuitry to generate contextual information from the personal data in the data store, and the memories creation processing circuitry is further arranged to incorporate that contextual information in the augmented given event.

23. An apparatus according to any preceding clause, wherein the apparatus is configured as a confidential computing environment to protect the confidentiality of the particular person.

In the present application, the words "configured to . . . ," are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
a data store to store personal data derived from signals gathered from a plurality of sensors used to monitor a particular person;
memories creation processing circuitry, responsive to detection of a given event associated with the particular person:
to perform an augmentation process during which the memories creation processing circuitry is arranged to generate an augmented given event identifying multiple items of data associated with the given event, including at least items of personal data associated with the given event obtained from the data store; and
to analyse the multiple items of data identified by the augmented given event in order to generate a given digital memory for the given event;
a memories data store to store digital memories generated, in response to detection of events, by the memories creation processing circuitry for the particular person; and
memories analysis circuitry to determine associations between the digital memories stored in the memories data store and to maintain a record of those associations.

2. An apparatus as claimed in claim 1, wherein the memories creation processing circuitry is arranged to analyse the multiple items of data identified by the augmented given event, with reference to a given model, in order to generate the given digital memory for the given event.

3. An apparatus as claimed in claim 2, wherein the given model is arranged to identify relational representations between items of personal data, and the memories creation processing circuitry is arranged to use the relational representations in the given model to determine, with reference to the multiple items of data identified by the augmented given event, the given digital memory.

4. An apparatus as claimed in claim 1, wherein the given digital memory identifies a memory type and one or more items of personal data pertaining to the given digital memory.

5. An apparatus as claimed in claim 1, wherein the memories creation processing circuitry is arranged to apply one of a rules based analysis, a machine learning driven analysis, or a hybrid of a rules based analysis and a machine learning driven analysis in order to generate the given digital memory.

6. An apparatus as claimed in claim 2, wherein the given model is subjected to a training phase prior to use by the memories creation processing circuitry to generate digital memories, wherein the training phase comprises obtaining input from the particular person in order to develop the given model to reflect the particular user's own knowledge.

7. An apparatus as claimed in claim 2, further comprising model creation circuitry to perform an automated analysis of the personal data in the personal data store to develop the given model.

8. An apparatus as claimed in claim 2, further comprising model update circuitry to refine the given model, based on the data identified by one or more augmented events used by the memories creation processing circuitry to generate associated digital memories.

9. An apparatus as claimed in claim 2, wherein the given model is one of a memories model, an emotion model, an inner quality model, a behavioural model, or a cognitive skill model.

10. An apparatus as claimed in claim 1, wherein the personal data in the personal data store is time stamped, and the memories creation processing circuitry is arranged, when performing the augmentation process, to seek to identify personal data within the personal data store that was generated at a same time as the given event.

11. An apparatus as claimed in claim 10, wherein the memories creation processing circuitry is arranged, in response to a query trigger during the augmentation process, to query one or more of the plurality of sensors to obtain additional personal data for use in generating the augmented given event.

12. An apparatus as claimed in claim 1, wherein the memories analysis circuitry is arranged to employ a graph database mechanism to determine and maintain the associations between digital memories.

13. An apparatus as claimed in claim 1, wherein the memories creation processing circuitry is arranged to detect the given event due to one or more of:
- an event trigger resulting from new personal data received for storage in the personal data store;
- an event trigger resulting from analysis of the personal data in the personal data store performed by the memories creation processing circuitry;
- an event trigger defined by the particular person;
- an event triggered by a sensor or associated device.

14. An apparatus as claimed in claim 1, wherein the personal data in the personal data store comprises at least cognitive data representative of a behavioural state, a biological state, or a combination thereof, of the particular person.

15. An apparatus as claimed in claim 14, wherein the cognitive data is raw cognitive data obtained from one or more cognitive sensors or processed cognitive data obtained from a behavioural processing unit based on analysis of the raw cognitive data.

16. An apparatus as claimed in claim 14, wherein the personal data in the personal data store further comprises data about external factors associated with the particular person.

17. An apparatus as claimed in claim 1, further comprising:
- digital twin creation circuitry to develop one or more cognitive skills via analysis of the digital memories stored in the memories data store and the record of the associations between the digital memories, to enable those one or more cognitive skills to be used to assist the particular person.

18. An apparatus as claimed in claim 17, wherein the digital twin creation circuitry is arranged to perform a hierarchization process to seek to evaluate the relative importance of the stored digital memories having regard to the one or more cognitive skills being developed and to maintain an indication of the relative importance of the stored digital memories.

19. An apparatus as claimed in claim 18, wherein the digital twin creation circuitry is arranged to perform a cleaning process in respect of relatively low importance digital memories in order to free up storage space for the storage of new digital memories created by the memories creation processing circuitry.

20. An apparatus as claimed in claim 17, wherein the digital twin creation circuitry is arranged to perform a pattern analysis process to search for patterns in the stored digital memories and the associations between the digital memories, to seek to create knowledge and/or user models for the one or more cognitive skills.

21. An apparatus as claimed in claim 17, wherein the digital twin creation circuitry is arranged to generate a feedback signal used to influence a given model used by the memories creation processing circuitry for generation of one or more subsequent digital memories.

22. An apparatus as claimed in claim 1, further comprising context handler circuitry to generate contextual information from the personal data in the data store, and the memories creation processing circuitry is further arranged to incorporate that contextual information in the augmented given event.

23. An apparatus as claimed in claim 1, wherein the apparatus is configured as a confidential computing environment to protect the confidentiality of the particular person.

24. A method of creating digital memories for a particular person, comprising:
- storing in a data store personal data derived from signals gathered from a plurality of sensors used to monitor a particular person;
- responsive to detection of a given event associated with the particular person, employing processing circuitry:
- to perform an augmentation process to generate an augmented given event identifying multiple items of data associated with the given event, including at least items of personal data associated with the given event obtained from the data store; and
- to analyse the multiple items of data identified by the augmented given event in order to generate a given digital memory for the given event;
- storing within a memories data store digital memories generated, in response to detection of events, by the processing circuitry for the particular person; and
- determining associations between the digital memories stored in the memories data store and maintaining a record of those associations.

25. A non-transitory computer-readable storage medium providing a computer program comprising program instructions which, when executed on a computer, cause the computer to implement the method of claim 24.

* * * * *